United States Patent
Blank et al.

[19]

[11] Patent Number: 6,016,234
[45] Date of Patent: Jan. 18, 2000

[54] ACTUATOR RETRACT/UNLOAD SYSTEM FOR LOW POWER DISK DRIVES

[75] Inventors: Timothy J. Blank, Byron; Zine-Eddine Boutaghou, Rochester; Kevin Jack Erickson, Rochester; Richard Greenberg, Rochester, all of Minn.

[73] Assignee: International Business Machines Corporation, Armonk, N.Y.

[21] Appl. No.: 08/900,961

[22] Filed: Jul. 25, 1997

Related U.S. Application Data

[63] Continuation of application No. 08/551,024, Oct. 31, 1995, abandoned, which is a continuation of application No. 08/174,950, Dec. 28, 1993, abandoned.

[51] Int. Cl.$^7$ .............................. G11B 21/12; G11B 5/54
[52] U.S. Cl. ........................................................ 360/75
[58] Field of Search ................................. 360/75, 105, 69

[56] References Cited

U.S. PATENT DOCUMENTS

| | | |
|---|---|---|
| 3,518,651 | 6/1970 | Keeney . |
| 3,772,666 | 11/1973 | Scholz et al. . |
| 4,005,485 | 1/1977 | Opocensky . |
| 4,139,874 | 2/1979 | Shiraishi . |
| 4,237,501 | 12/1980 | Barmache et al. ................. 360/75 |
| 4,371,903 | 2/1983 | Lewis . |
| 4,658,308 | 4/1987 | Sander, Jr. ........................ 360/74.1 |
| 4,679,102 | 7/1987 | Wevers et al. . |
| 4,710,834 | 12/1987 | Brand et al. . |
| 4,764,831 | 8/1988 | Patel . |
| 4,786,995 | 11/1988 | Stupeck et al. ..................... 360/75 |
| 4,807,062 | 2/1989 | Onodera ........................... 360/75 |
| 4,816,942 | 3/1989 | Tanishima et al. . |
| 4,831,469 | 5/1989 | Hanson et al. ..................... 360/75 |
| 4,866,554 | 9/1989 | Stupeck et al. . |
| 4,903,157 | 2/1990 | Malek . |
| 5,057,954 | 10/1991 | O'Sullivan et al. . |
| 5,124,867 | 6/1992 | Kitahori et al. . |
| 5,325,030 | 6/1994 | Yamamura et al. ................. 360/105 X |

FOREIGN PATENT DOCUMENTS

| | | |
|---|---|---|
| 54-38107 | 3/1979 | Japan . |
| 63-86168 | 4/1988 | Japan . |
| 1151086 | 6/1989 | Japan . |
| 2121589 | 12/1983 | United Kingdom . |

OTHER PUBLICATIONS

IBM Technical Disclosure Bulletin, vol. 33, No. 6A, Nov. 1990, pp. 389–390, entitled "Voice Coil Motor Go Home Circuit".

IBM Technical Disclosure Bulletin, vol. 31, No. 5, Oct. 1988, pp. 96–98, entitled "Load/Unload Disk File Mechanism Incorporating a Separate Raised Read/Write Head Landing Zone".

IBM Technical Disclosure Bulletin, vol. 35, No. 4B, Sep. 1992, pp. 424–425, entitled "Spindle Motor Brake Circuit".

IBM Technical Disclosure Bulletin, vol. 33, No. 6A, Nov. 1990, pp. 393–394, entitled "Spindle Motor Brake Circuit".

*Primary Examiner*—Aristotelis M. Psitos
*Assistant Examiner*—James L Habermehl
*Attorney, Agent, or Firm*—Richard E. Billion; John A. Merecki; Schmeiser, Olsen & Watts

[57] ABSTRACT

A capacitor discharge retract system is provided for small disk drives wherein the small spindle size is incapable of generating enough electrical energy to enable conventional actuator retraction and the form factor is too small to accommodate capacitors of sufficient size to enable a conventional capacitive discharge system. A capacitive discharge retract technique is enabled using an elevated voltage, significantly above the disk drive supply voltage, to allow smaller capacitive storage elements to perform the function. The effectiveness of the system is further enhanced in those environments where a source of the required elevated voltage can be found already resident in the device circuitry where it was generated to support another function.

15 Claims, 4 Drawing Sheets

ACTUATOR RETRACT/UNLOAD SYSTEM FOR LOW POWER DISK DRIVES

This application is a continuation of application Ser. No. 08/551,024, filed Oct. 31, 1995, now abandoned which is a continuation of application Ser. No. 08/174,950, filed Dec. 28, 1993, now abandoned.

FIELD OF THE INVENTION

This invention relates to a method and apparatus for retracting the transducer heads of a disk drive upon loss of power. More particularly, this invention provides for retraction of the transducer heads using physical apparatus of sufficiently reduced size to enable successful use in miniature disk drives.

BACKGROUND OF THE INVENTION

Rotating disk data storage devices and particularly rigid disk magnetic disk drives have always been sensitive to even occasional contact between the transducer head, which normally flies above the disk surface, and the disk data surface. Such contact is the major cause of lost data and catastrophic drive failure. The problem becomes more severe as data densities are increased and drive size is reduced. Increased data density is attained using higher relative velocities between head and disk; smaller, more delicate head structures and thinner magnetic coatings with each of these parameters making more severe the problem of head-disk contact.

The greatest potential for damage to the drive, if not anticipated and compensated for, is the prolonged contact between head and disk when power to the spindle motor is interrupted, either when the device is powered down or power is otherwise interrupted and the disks coast to a stop. This problem has been overcome by moving the heads to a landing zone, usually at the disk inner diameter and braking the disk spindle assembly to terminate disk rotation.

Two techniques have been most commonly used to resolve the problem of head-disk contact following power interruption. One method is to retract the heads to the landing or unloading zone using the kinetic energy of the rotating spindle. The DC spindle motor windings function to generate a current as the spindle motor spins down, to drive the actuator to a retracted position following which the spindle can be dynamically braked by shorting the spindle motor windings. Another technique used to retract the actuator to a landing position is the provision of capacitive storage which is charged during normal power on operation and is switched to drive the actuator when power to the device is turned off or otherwise interrupted.

These techniques are adequate and successful in larger drives including 5¼ and 3½ inch form factors, but problems develop in the design of very small drives such as those conforming to the Personal Computer Memory Card Industry Association (PCMCIA) Type II and smaller dimensional standards. PCMCIA Type III drives have an overall height of 10.5 millimeters, while the PCMCIA Type II drives have an overall height of only 5 millimeters. With a length and width of approximately 3¼ and 2 inches respectively, there is very little space for the disk assembly, spindle motor, actuator and transducer assembly, the surrounding sealed enclosure and the various data channel, servo, motor driver and control circuits. The disk and spindle assembly have sufficient kinetic energy to generate the power required to drive the actuator when power is interrupted; however, it has not been possible to convert the kinetic energy to electrical energy in motors of the sizes used in the confined space of the PCMCIA type II and smaller form factors.

As the size of disk drives continues to shift toward smaller and smaller form-factors it is apparent that new technologies will have to be developed to overcome the many new complications associated with this paradigm shift. A major complication discovered recently while developing a prototype for a PCMCIA Type II form factor disk drive was the lack of any usable spindle system energy, energy that has been traditionally used to provide for the retract/unload operation in larger form-factor drives, thus necessitating the use of an alternative energy storage mechanism, such as a capacitor. Another initial complication was the physical size of the capacitor required to provide for the retract/unload operation in the traditional capacitor assisted retract circuit. The size determined to be sufficient to provide for the retract/unload operation could not be made to fit in the highly limited physical space for components.

SUMMARY OF THE INVENTION

In the present invention, a capacitor assisted actuator retract circuit is enhanced by using an elevated supply voltage +Vcc+. Previously the voltage source for charging the retract/unload capacitors has been obtained from the host. In the PCMCIA environment, which is a low voltage, low power design, the host supply voltage is currently either 3.3V or 5.0V. In the preferred embodiment described, the higher voltage, +Vcc+ is supplied by an elevated voltage generated internally by one of the driver modules to provide more efficient FET operation. Effectively, this is the use of an available voltage source which is free. However, if a suitable higher DC voltage is not available within the device circuitry, a DC to DC converter circuit portion could be introduced into the drive circuitry for this purpose.

DETAILED DESCRIPTION

As discussed above, conventional methods of actuator retraction when a power interruption is experienced have not been applicable to PCMCIA Type II and smaller form factor drives. In such devices there is no existing technique for effectively converting kinetic energy to electrical energy and space restrictions preclude the use of capacitive storage required for conventional capacitor assisted retract circuits.

An analysis was performed to determine the minimum capacitor value required to retract/unload the actuator of a typical prototype PCMCIA Type-II drive to the point where the unload ramp detent is engaged. The analysis takes into account the most significant loss elements in the electromechanical system, as well as the exchange between potential energy and kinetic energy, and the storage and release of kinetic energy. In this analysis the actuator arrives at the detent position with essentially zero velocity with no safety margin. In an actual application the capacitor must be selected to provide an adequate safety margin.

Figure 1:
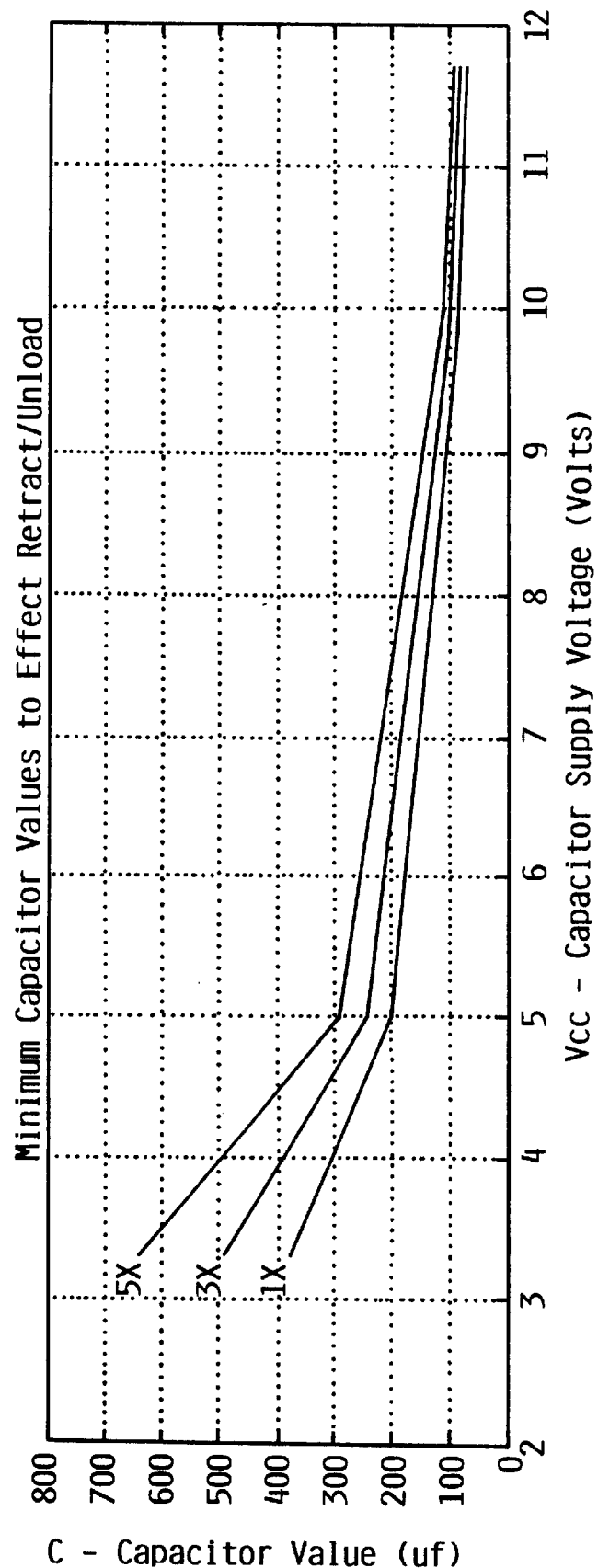
FIG. 1 is a set of curves illustrating the difference in capacitor values required to store the same charge with supply voltages of 3.3, 5.0, 10.0 and 11.7 volts.

FIG. 1 contains the results of the analysis in terms of a plot that shows the minimum capacitor value for capacitor voltage sources of 3.3V, 5.0V, 10.0V and 11.7V. It also shows the effects of variability in the amount of friction that must be overcome. This particular example shows the effects of variability in the amount of actuator bearing friction from a nominal value case (1X) at room temperature, to an off-nominal case (3X), to an off-nominal case at reduced temperature (5X).

Several things should be noted regarding this plot that clearly illustrate the advantages of using a boosted supply voltage for the retract/unload circuit. First, the plot distinctly shows an exponential nature whereby the capacitor value required rapidly increases as the supply voltage available is reduced. For the non-boosted 3.3V and 5.0V cases several hundred microfarads of capacitance is required, while for the boosted 10.0V and 11.7V cases the required capacitance is in the neighborhood of 100 uF or less. Second, the effects of parametric variability are much more pronounced at lower supply voltages. This plot only shows potential variability in the actuator bearing friction parameter. The actuator bearing friction is the least significant of the friction components (not knowing what the friction equivalent of the torque induced by the flex cable which electrically connects to the moving actuator assembly to the stationary drive circuitry will be). This would suggest that variability in the ramp sliding friction parameter could also significantly effect the required capacitor value at lower supply voltages. In addition, the supply voltage itself can also have parametric variations as there is some tolerance allowed in most power supply voltage specifications.

It is obvious that it would be much more difficult to provide sufficient capacitance to guarantee the retract-unload operation with a reasonable margin of safety in the lower power supply voltage cases than it is in the boosted power supply voltage cases. Based on a real PCMCIA Type-II prototype drive design with the best capacitor technology available today, it is feasible to provide for about 150 uF within the allowable electronics packaging space, using two discrete surface mount capacitors. It is certainly not feasible at this time (or most likely at any time in the near future) to provide for several hundred microfarads of capacitance in the Type-II form-factor. Therefore the need for +Vcc+ is necessary, preferably by using an already existing source of boosted voltage or, in the absence of such a voltage source, generating a higher voltage for this purpose.

Figure 2:
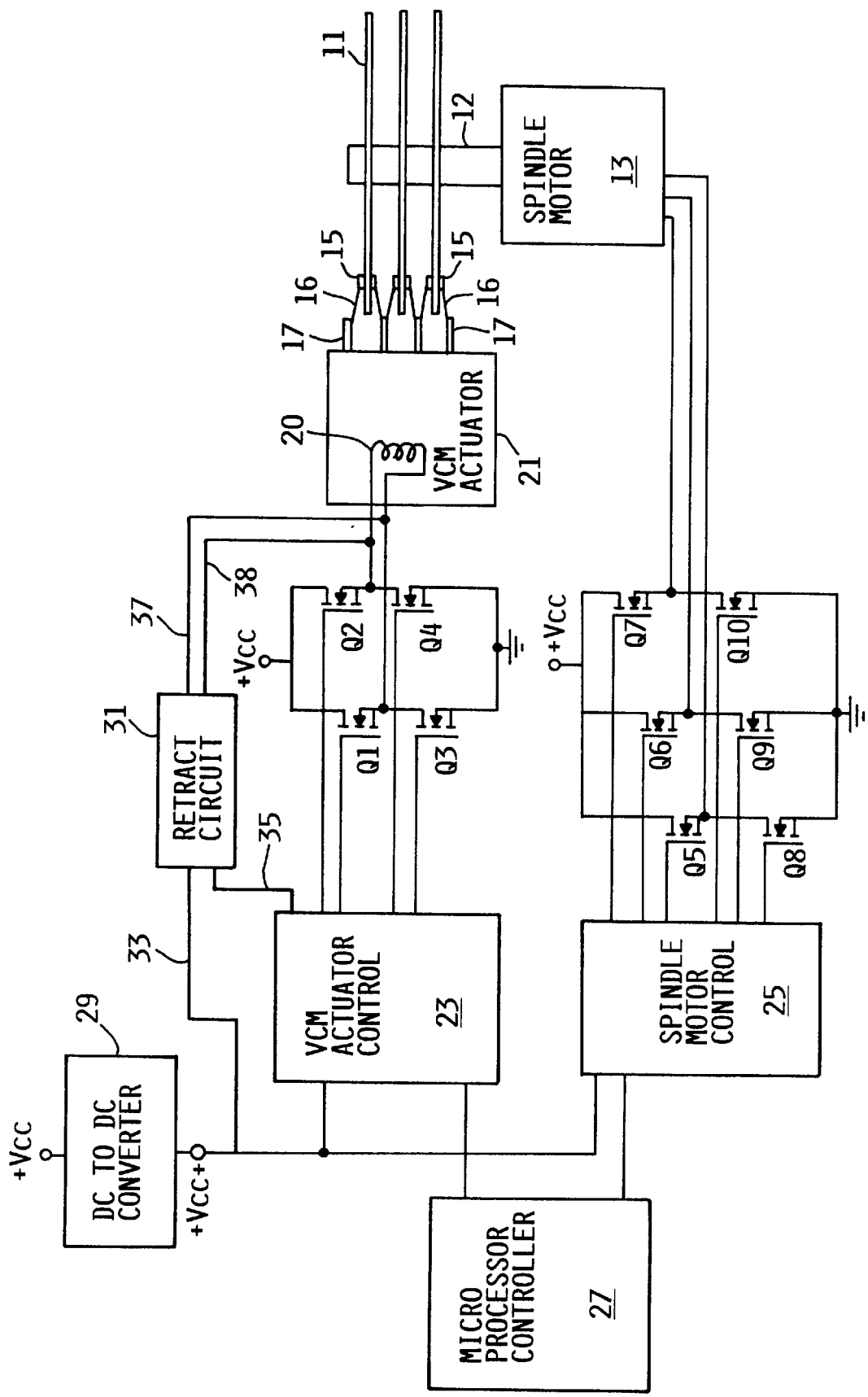
FIG. 2 is a block diagram of a disk drive system using the present invention to power the actuator retract circuit.

FIG. 2 schematically illustrates a typical rigid disk drive for storing data on the surfaces of disk media. One or more disks 11 are clamped to a spindle 12 to form an assembly that rotates in unison with the armature of a brushless DC spindle motor 13. A series of transducer heads 15 are used to write data on and read data from tracks on the respective confronting disk surfaces. Each transducer head is supported by a resilient suspension 16 that is mounted on an actuator arm 17. The head arm assembly includes a voice coil 20 that is positioned in a magnetic field so that the voice coil motor can either pivot or reciprocate the head arm assembly to move the transducer heads in unison from one track location to another track location or enable a transducer to closely follow a selected track.

The actuator voice coil motor (VCM) 21 is controlled by the control circuitry 23 and the actuator driver circuits including transistors Q1 through Q4. During normal power on operation of the disk drive, transistor pairs Q1 and Q4 or Q2 and Q3 are individually turned on to drive the head-arm assembly in one direction or the other in response to the magnitude of current and the direction of current flow through the voice coil 20. When the supply current +Vcc is interrupted, the driver circuit (including transistors Q1 through Q4) is inoperative, and the retract enable signal on line 35 activates the retract circuit to supply power on lines 37 and 38 to the voice coil which retracts and unloads the transducer heads.

The three phase brushless DC motor 13 that drives the disk-spindle assembly is similarly controlled by the spindle motor control circuitry 25 and the spindle driver assembly which includes transistors Q5 through Q10. Transistors Q5 through Q10 are sequentially turned on and off to provide current +Vcc to the motor windings to commutate the spindle motor. Microprocessor 27 exercises overall control of the disk drive including, in addition to the motor control shown, the other drive functions such as the handling of data, servo control and error identification and recovery which are not shown.

Also included is a DC to DC converter 29 that is supplied with the device input voltage, +Vcc and provides an enhanced +Vcc+ output voltage. This is effected by pulsing an inductance in a readily known manner to output an elevated voltage, +Vcc+. The example used for the curves of FIG. 1 provided a voltage increase of 6.7V therefore the supply voltages of 3.3V and 5.0V can produce the converted voltages of 10.0V and 11.7V respectively.

Figure 3:
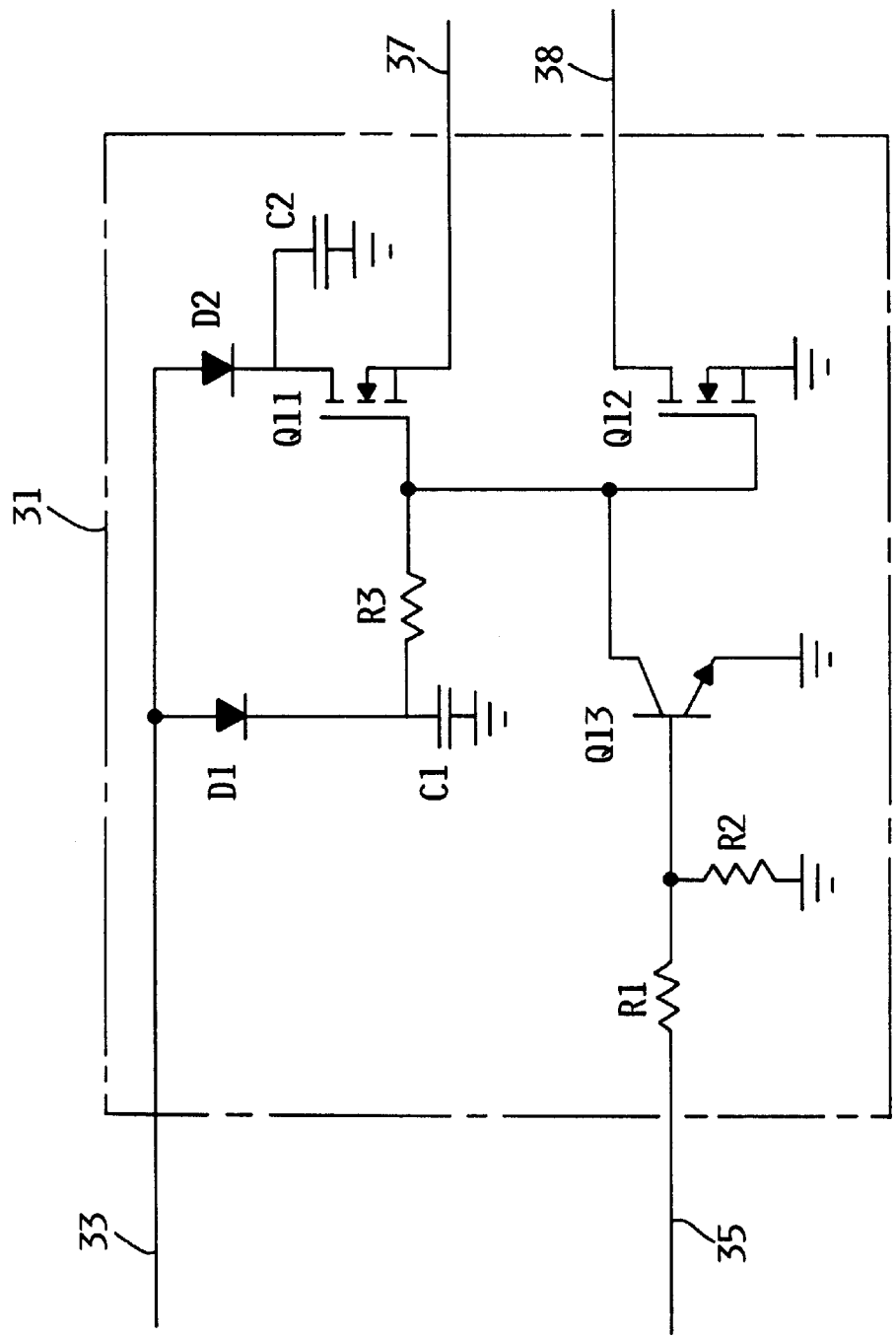
FIG. 3 is a more detailed view of the retract circuit of FIG. 2.

The converted voltage on line 33 is supplied to retract circuit 31, shown in greater detail in FIG. 3. The enable signal on line 35 is simply a power on signal such that while the drive is powered up by the supply voltage, the retract circuit is disabled by transistor Q13 and the voice coil 20 is under control of the driver circuit and particularly transistors Q1 through Q4. When power is interrupted, the absence of a DC voltage on line 35 actuates the retract circuit. Simultaneously, the elevated current +Vcc+ on line 33 supplies and maintains the charge on capacitors C1 and C2. When power to the drive is interrupted, transistor Q13 is no longer active and capacitors C1 and C2 are isolated from the +Vcc+ supply line 33 by diodes D1 and D2. The charge from capacitor C1 makes transistors Q11 and Q12 active, causing the charge from capacitor C2 to pass to voice coil 20 and drive the head arm assembly to the landing zone or head unload location depending upon the technique used by the drive.

Figure 4:
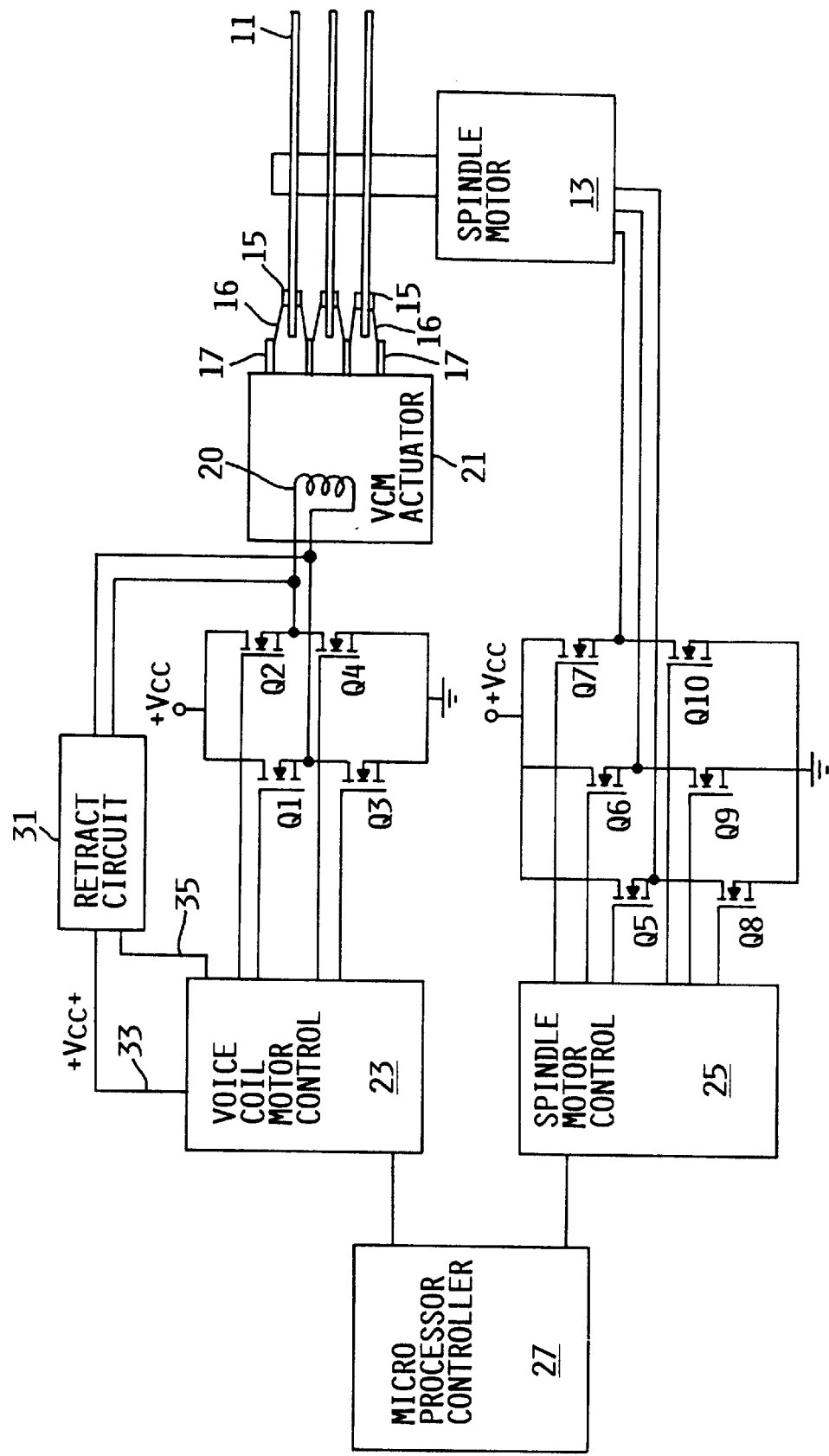
FIG. 4 is similar to FIG. 2, but illustrates the source of elevated voltage supply, +Vcc+ as being the voice coil motor driver control circuit.

In some disk drive environments an elevated source of voltage exists within a portion of the circuitry to enhance another drive function. In one example, the motor control circuitry includes a DC to DC converter to provide an enhanced voltage used to improve the performance of the transistors which drive the voice coil and spindle motor. FIG. 4 is similar to FIG. 2, but shows the voice coil motor control circuitry as the source of the elevated voltage supply, +Vcc+ to illustrate an environment wherein an elevated voltage generated for other functions within a circuit module is available. If such a function exists, the elevated voltage is available without further cost or additional circuits. If such a circuit is not available, there is little difficulty in providing the DC to DC converter function.

While the invention has been particularly shown and described with reference to preferred embodiments, it will be understood by those skilled in the art that various changes in form and details may be made therein without departing from the spirit and scope of the invention.

What is claimed is:

1. A method of retracting the head positioning actuator assembly of a disk drive device upon interruption of power to the device comprising the steps of charging a first capacitor during normal operation with a voltage in excess of the supply voltage applied to the device to develop a stored charge on the first capacitor;

charging a second capacitor;

discharging the second capacitor, upon interruption of power to the device;

discharging the first capacitor, upon discharging the second capacitor;

passing the stored charge from the first capacitor directly to the actuator assembly, upon discharging the first capacitor; and driving the actuator assembly to a predetermined retracted position.

2. The method of disk drive actuator retraction of claim 1 wherein the voltage in excess of the supply voltage is substantially greater than the primary supply voltage and is at least 10 volts.

3. The method of disk drive actuator retraction of claim 2 wherein the voltage in excess of the primary supply voltage is derived from a source already resident within the disk drive circuitry.

4. The method of disk drive actuator retraction of claim 2 further comprising the step of sensing an interruption of primary power supplied to said disk drive device.

5. The method of retracting the head positioning actuator assembly of a disk drive device upon interruption of power to the device of claim 1 wherein the step of driving the actuator assembly to a predetermined retracted position is driving the actuator to a head unload position.

6. The method of retracting the head positioning actuator assembly of a disk drive device upon interruption of power to the device of claim 1 wherein the step of driving the actuator assembly to a predetermined retracted position is driving the actuator to a designated landing zone on the disk.

7. A magnetic disk storage device including at least one disk storage media and a plurality of transducer heads respectively confronting disk surfaces for writing data to and reading data from the disk surface comprising an actuator assembly that carries said transducer heads for movement from one track location to another track location;

electromotive means associated with said actuator assembly for driving said transducer heads from one track to another track location;

electric drive circuit means for supplying a driving current to said electromotive means during power on operation;

first capacitive storage means for holding a stored charge;

second capacitive storage means;

alternate drive means for passing the stored charge directly from said first capacitive storage means to said electromotive means;

means for charging said first capacitive storage means during normal power on operation of said device using a higher voltage than is supplied to said disk storage device, said source of elevated voltage from another circuit module within the device circuitry wherein the voltage was generated for another function; and switch means including said second capacitive storage means for switching said electric drive circuit means to said alternate drive means when said electric drive means current is interrupted.

8. The magnetic storage device of claim 7 wherein said means for charging said capacitive storage means provides a voltage in excess of twice the supply voltage to the device.

9. A method of retracting the head positioning actuator assembly of a disk drive device upon interruption of power to the device comprising the steps of charging a capacitor during normal power on operation with a voltage in excess of the supply voltage applied to the device to develop a stored charge on the capacitor;

switching a capacitor circuit, upon interruption of power to the device;

discharging the capacitor, upon switching the capacitor circuit;

passing the stored charge from the capacitor directly to the actuator assembly, upon discharging the capacitor; and driving the actuator assembly to a predetermined head unload position.

10. A method of retracting the head positioning actuator assembly of a PCMCIA Type-II or smaller disk drive device upon interruption of power to the device comprising the steps of charging a first capacitor during normal power on operation with a voltage in excess of the supply voltage applied to the device to develop a stored charge on the first capacitor;

charging a second capacitor;

discharging the second capacitor, upon interruption of power to the device;

discharging the first capacitor, upon discharging the second capacitor;

passing the stored charge from the first capacitor directly to the actuator assembly, upon discharging the first capacitor; and driving the actuator assembly to a predetermined retracted position.

11. A method of retracting the head positioning actuator assembly of a disk drive device upon interruption of power to the device comprising the steps of charging a first capacitor during normal power on operation with a voltage in excess of the supply voltage applied to the device to develop a stored charge on the capacitor;

charging a second capacitor;

isolating the first capacitor upon power interruption through a first diode;

isolating the second capacitor upon power interruption through a second diode;

discharging the second capacitor, upon isolating the second capacitor;

discharging the first capacitor, upon isolating the first capacitor and upon discharging the second capacitor;

passing the stored charge from the first capacitor directly to the actuator assembly, upon discharging the first capacitor; and driving the actuator assembly to a predetermined retracted position.

12. A magnetic disk storage device including at least one PCMCIA Type-II or smaller disk storage media and a plurality of transducer heads respectively confronting disk surfaces for writing data to and reading data from the disk surface comprising an actuator assembly that carries said transducer heads for movement from one track location to another track location;

electromotive means associated with said actuator assembly for driving said transducer heads from one track location to another track location;

electric drive circuit means for supplying a driving current to said electromotive means during power on operation;

first capacitive storage means for holding a stored charge;

second capacitive storage means;

alternate drive means for passing the stored charge directly from said first capacitive storage means to said electromotive means;

means for charging sad first capacitive storage means during normal power on operation of said device using a higher voltage than is supplied to said disk storage device, said source of elevated voltage from another circuit module within the device circuitry wherein the voltage was generated for another function; and switch means including said second capacitive storage means for switching said electric drive circuit means to said alternate drive means when said electric drive means current is interrupted.

13. A magnetic disk storage device including at least one disk storage media and a plurality of transducer heads respectively confronting disk surfaces for writing data to and reading data from the disk surface comprising an actuator assembly that carries said transducer heads for movement from one track location to another track location;

electromotive means associated with said actuator assembly for driving said transducer heads from one track location to another track location;

electric drive circuit means for supplying a driving current to said electromotive means during power on operation;

first capacitive storage means for holding a stored charge;

first isolation means for isolating the first capacitive storage means during power interruption;

second capacitive storage means;

second isolation means for isolating the second capacitive storage means during power interruption;

alternate drive means for passing the stored charge directly from said first capacitive storage means to said electromotive means;

means for charging said first capacitive storage means during normal power on operation of said device using a higher voltage than is supplied to said disk storage device, said source of elevated voltage from another circuit module within the device circuitry wherein the voltage was generated for another function; and switch means including said second capacitive storage means for switching said electric drive circuit means to said alternate drive means when said electric drive means current is interrupted.

14. A method of retracting the head positioning actuator assembly of a PCMCIA Type II or smaller disk drive device upon interruption of power to the device comprising the steps of charging a capacitor during normal power on operation with a voltage in excess of the supply voltage applied to the device to develop a stored charge on the capacitor;

switching a capacitor circuit, upon interruption of power to the device;

discharging the capacitor, upon switching the capacitor circuit;

passing the stored charge from the capacitor directly to the actuator assembly, upon discharging the capacitor; and driving the actuator assembly to a predetermined head unload position.

15. A method of retracting the head positioning actuator assembly of a disk drive upon interruption of power to the device comprising the steps of charging a capacitor during normal power on operation with a voltage in excess of the supply voltage applied to the device to develop a stored charge on the capacitor;

isolating the capacitor circuit during interruption of power to the device;

switching a capacitor circuit, upon isolating the capacitor circuit;

discharging the capacitor, upon switching the capacitor circuit;

passing the stored charge from the capacitor directly to the actuator assembly, upon discharging the capacitor; and driving the actuator assembly to a predetermined head unload position.

* * * * *